US009027727B2

(12) United States Patent
Danford (10) Patent No.: US 9,027,727 B2
(45) Date of Patent: May 12, 2015

(54) COUPLING SYSTEM AND METHOD FOR A VEHICLE

(71) Applicant: Honda Motor Co., Ltd., Tokyo (JP)

(72) Inventor: Kevin Danford, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 148 days.

(21) Appl. No.: 13/680,820

(22) Filed: Nov. 19, 2012

(65) Prior Publication Data

US 2014/0138204 A1  May 22, 2014

(51) Int. Cl.
*F16D 27/02* (2006.01)
*F16D 27/00* (2006.01)
*F16D 43/18* (2006.01)

(52) U.S. Cl.
CPC .............. *F16D 27/00* (2013.01); *F16D 27/02* (2013.01); *F16D 43/18* (2013.01)

(58) Field of Classification Search
USPC ...................................... 192/84.8, 90; 417/16
See application file for complete search history.

(56) References Cited

U.S. PATENT DOCUMENTS

| | | | |
|---|---|---|---|
| 4,697,991 A * | 10/1987 | Tsukahara et al. ............ | 417/319 |
| 5,474,428 A * | 12/1995 | Kimura et al. ................ | 417/223 |
| 5,765,521 A * | 6/1998 | Stutzle et al. ............... | 123/196 S |
| 6,095,117 A | 8/2000 | Minowa et al. | |
| 7,543,695 B2 | 6/2009 | Redelman et al. | |
| 7,726,948 B2 * | 6/2010 | Hunter et al. ................. | 417/213 |
| 7,730,982 B2 | 6/2010 | Hidaka et al. | |
| 8,066,492 B2 * | 11/2011 | Rogner ......................... | 417/374 |
| 2007/0272509 A1 * | 11/2007 | Peschek et al. ................ | 192/90 |
| 2009/0011886 A1 | 1/2009 | Schondelmaier | |
| 2011/0236231 A1 * | 9/2011 | Ikegawa ....................... | 417/316 |

FOREIGN PATENT DOCUMENTS

GB    2339606    2/2000

OTHER PUBLICATIONS

SAE 851532 The Engineering Resource for Advancing Modiblity, "Using Electric Clutches with Hydraulic Pumps to Improve Vehicle Productivity and Fuel Efficiency", Jack E. West, 1985 International Off-Highway & Powerplant Congress & Exposition, MECCA, Milwaukee, WI Sep. 9-12, 1985.
SAE 2005-01-4086 SAE Technical Paper Series, "Application of electric oil pump on automotive systems", Eduardo Gubbiotti Ribeiro et al., XIV Congresso Exposicao Internacionals da Tecnologia da Mobilidade, Sao Paulo, Brasil Nov. 22-24, 2005.
SAE 2006-01-1595 SAE Technical Paper Series, "Development of Electric Oil Pump", Eiji Miyachi et al., 2006 SAE World Congress, Detriot, Michigan Apr. 3-6, 2006.

* cited by examiner

*Primary Examiner* — Rodney H Bonck
(74) *Attorney, Agent, or Firm* — Rankin, Hill & Clark LLP (57) ABSTRACT

A coupling system and method for a powered component on a vehicle includes a powered component, a rotating member mechanically driven by an engine on the vehicle and a radial coupling between the powered component and the rotating member for mechanically powering the powered component.

12 Claims, 5 Drawing Sheets

COUPLING SYSTEM AND METHOD FOR A VEHICLE

BACKGROUND

Vehicle oil pumps are generally either mechanical or electrical. Mechanical oil pumps are typically mechanically coupled to the engine, particularly to the crankshaft thereof. For example, known mechanical oil pumps include those that are gear-driven directly off the crankshaft of the vehicle's engine and those that are spaced apart from the crankshaft (e.g., located in the engine sump or oil pan) and driven by a force transfer element, such as a chain or belt. Electric oil pumps are typically electrically coupled to the vehicle's battery for powering thereof and are typically mounted external to the engine and only coupled to the engine via fluid connections (i.e., input and output). Electric oil pumps generally allow for a greater control of oil flow and pressure characteristics resulting in greater engine efficiency and life.

As the electric oil pump is not mechanically coupled to the engine, the engine will lose oil pressure in the event electrical power to the pump is interrupted. Notwithstanding the potential engine efficiency benefits, the loss of oil pressure associated with an interruption of electrical power is a primary reason why many vehicle manufactures do not apply an electric oil pump.

SUMMARY

A coupling system and method for a powered component on a vehicle includes a powered component, a rotating member mechanically driven by an engine on the vehicle and a radial coupling between the powered component and the rotating member for mechanically powering the powered component.

According to another aspect, a coupling system for a powered component on a vehicle includes an engine disposed on the vehicle, a rotating member mechanically driven by the engine and a powered component disposed on the vehicle. The system further includes a radial coupling having an engaged state and a disengaged state. The radial coupling mechanically coupling the rotating member and the powered component when in the engaged state and decoupling the rotating member and the powered component when in the disengaged state.

According to a further aspect, a coupling method is provided for a powered component on a vehicle. In the method according to this aspect, a rotating member of the vehicle is mechanically driven with output torque from an engine of the vehicle. The powered component is coupled to the rotating member for mechanically powering the powered component with the output torque from the engine. Coupling the powered component to the rotating member includes radially moving an engaging member of the powered component into coupling engagement with the rotating member.

DETAILED DESCRIPTION

Figure 1:
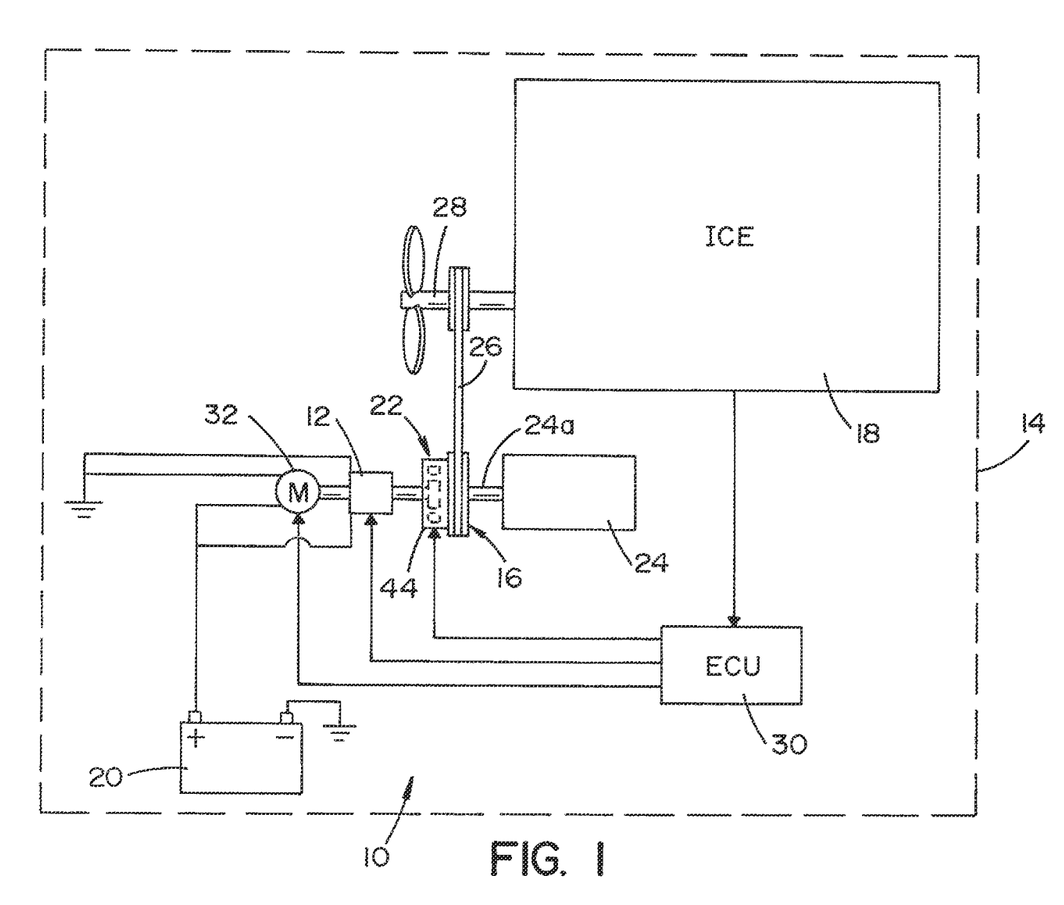
FIG. 1 is a schematic view of a coupling system for a vehicle according to an embodiment.

Referring now to the drawings, wherein the showings are for purposes of illustrating one or more exemplary embodiments and not for purposes of limiting same, FIG. 1 schematically illustrates a coupling system 10 for a powered component 12 on a vehicle 14. The system 10 can include the powered component 12 disposed on the vehicle 14 and a rotating member 16 mechanically driven by an engine 18, which is itself disposed on the vehicle 14. As will be described in more detail below, the system 10 can further include a radial coupling 22 between the powered component 12 and the rotating member 16 for mechanically powering the powered component 12. More specifically, the radial coupling 22 can have an engaged state and a disengaged state. In the engaged state, the radial coupling 22 can mechanically couple the rotating member 16 and the powered component 12. In the disengaged state, the radial coupling can mechanically decouple the rotating member 16 and the powered component 12.

In the embodiment illustrated in FIG. 1, the coupling system 10 also includes a battery 20 disposed on the vehicle 14 and electrically connected to the powered component 12 for providing electric power thereto, though the battery 20 is not required, as will be described in one or more alternate embodiments below. When included, such as in the illustrated embodiment of FIG. 1, the battery 20 can electrically power to the powered component 12 and the radial coupling can mechanically power the powered component 12 in addition or instead of the electric power provided by the battery 20. The battery 20 can be the primary battery of the vehicle 14, though this is not required, and can electrically power the powered component 12 via an electric motor 32. In one particular embodiment, which is described in more detail below, the coupling system 10 is a passive fail-safe system with the radial coupling 22 between the powered component 12 and the rotating member 16 being passively arranged such that the radial coupling 22 changes from the disengaged state to the engaged state in the event of an unexpected power disruption form the battery 20 to the powered component 12 (e.g., the powered component 12 can be radially coupled to the rotating member 16 only in the event of an unexpected power disruption form the battery 20 to the powered component 12).

In the embodiment illustrated in FIG. 1, the rotating member 16 can be a pulley member associated with another vehicle component 24 that is driven by rotation of the engine 18. In particular, the rotating member 16 can be coupled to the engine 18 for driven rotation thereby by a force transfer element 26. In the embodiment schematically illustrated, the force transfer element 26 is coupled to a crankshaft 28 of the engine 18 for driven rotation thereby. The force transfer element 26 can be, for example, a belt, chain, etc. The vehicle component 24 can be any component of the vehicle 14 that is normally driven by engine rotation. For example, the vehicle component 24 could be an oil pump, an AC compressor, an alternator, a water pump, a power steering pump or any other system to increase system control reliability. As shown and as is understood and appreciated by those skilled in the art, the rotating member 16 is operatively connected to the vehicle component 24 so as to transfer rotational force or torque from the engine 18 via the crankshaft 28 and force transfer element 26 to the vehicle component 24. For example, the rotating member 16 (e.g., a pulley) can be operatively connected to the vehicle component 24 via a shaft 24a of the vehicle component 24.

Figure 2:
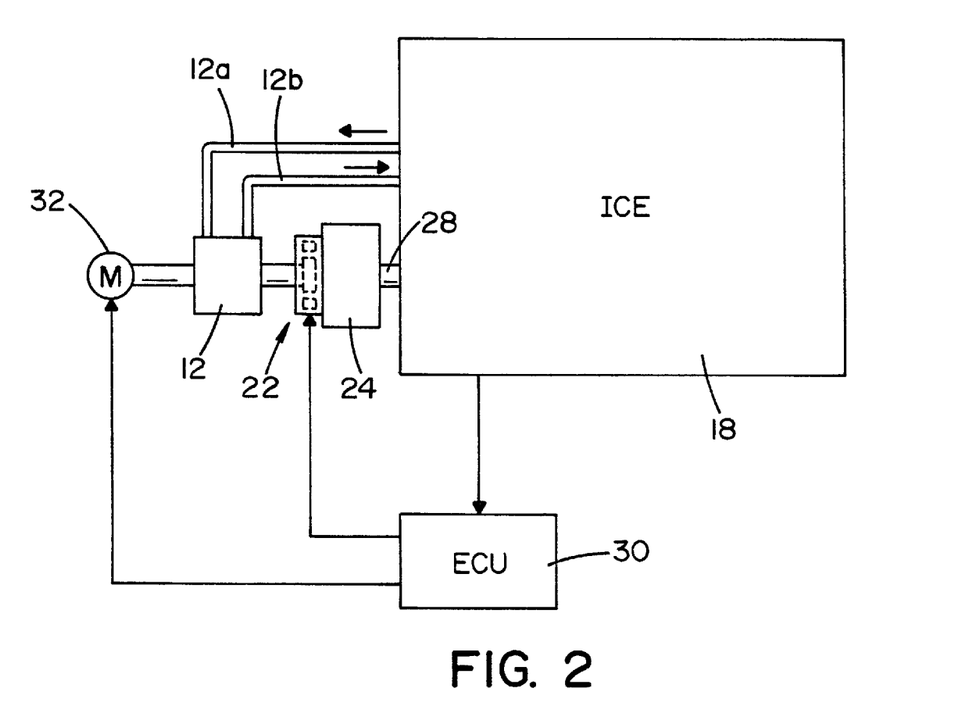
FIG. 2 is a schematic view of a coupling system for a vehicle according to the same or another embodiment.

In one embodiment, and with additional reference to FIG. 2, the powered component 12 can be an oil pump, though this is not required. When configured as an oil pump, and as shown in FIG. 2, the powered component 12 can have a fluid input line 12a and a fluid output line 12b, both fluidly connected to the engine 18 for circulating oil through the engine 18. Optionally, and as generally shown in FIG. 2, the vehicle component 24 need not be coupled to the engine 18 in the specific arrangement depicted in FIG. 1, but instead could be coupled to the engine 18 in any manner which is known and understood by those skilled in the art for transferring rotational power or torque from the engine 18 to the vehicle component 24. For example, the vehicle component 24 could be directly and mechanically powered by the crankshaft 28. The radial coupling 22 can still optionally connect mechanically the engine 18 and rotation therefrom to the powered component to replace or supplement power from the motor 32.

As shown in both FIGS. 1 and 2, the coupling system 10 can further include an electronic control unit (ECU) 30 operatively connected to the powered component 12 (e.g., an oil pump as discussed above) for control thereof. In particular, the electronic control unit 30 can send command signals to the oil pump for controlling at least one of flow rate and pressure delivered by the oil pump. Though not shown, but as will be appreciated and understood by those skilled in the art, the powered component 12 can also send signals back to the ECU 30 to facilitate control of the powered component 12 and/or other components of the vehicle 14.

Figure 3:
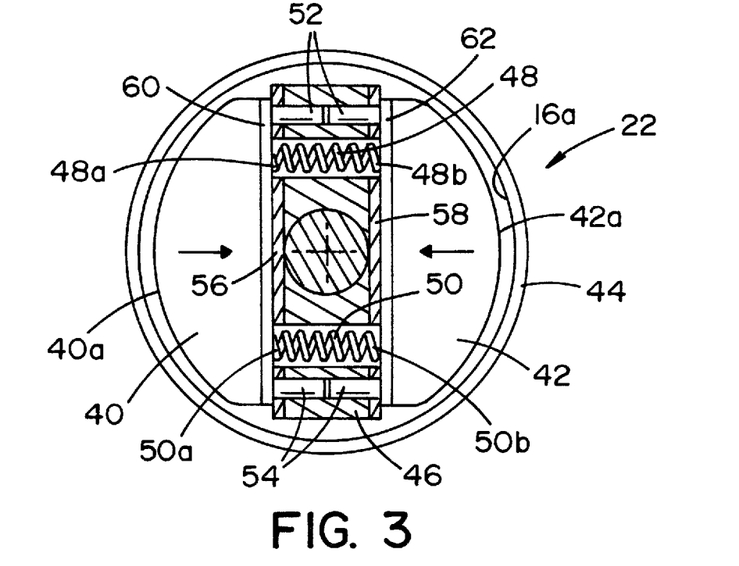
FIG. 3 is a schematic elevational view of a radial coupling shown in a disengaged or decoupled state.
Figure 4:
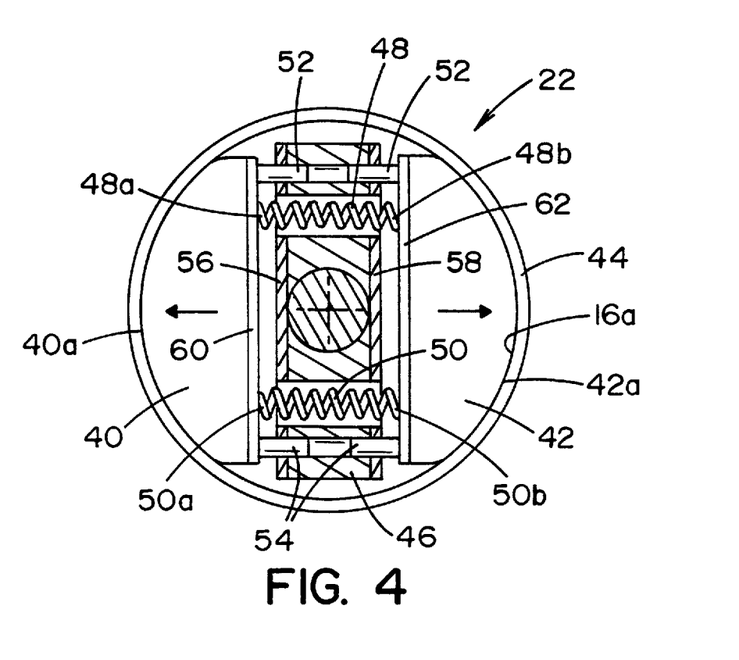
FIG. 4 is a schematic elevational view similar to FIG. 3 but showing the radial coupling in an engaged state coupling a powered component and a rotating member of either of the systems of FIG. 1 or FIG. 2.

With additional reference to FIGS. 3 and 4, the powered component 12 can include at least engaging member (e.g., shoes 40, 42) that is radially movable between an engaged position shown in FIG. 4 and corresponding to the engaged state of the radial coupling 22 and a disengaged state shown in FIG. 3 and corresponding to the disengaged state of the radial coupling 22. In the engaged position, the at least one engaging member mechanically couples the powered component 12 and the rotating member 16 such that drive torque from the engine 18 is applied to the powered component 12 for mechanical powering thereof. In the disengaged position, the engaging member is radially decoupled from the rotating member 16. When in the disengaged position, if the battery 20 is included and electrically connected to the powered component 12, only electric power from the battery 20 is able to power the powered component 12 due to the mechanical decoupling between the powered component 12 and the rotating member 16. Thus, in the engaged position, the at least one shoe or engaging member is coupled to the rotating member 16 for co-rotation therewith and, in the disengaged position, the at least one shoe or engaging member is decoupled from the rotating member 16.

In the illustrated embodiment, and with particular reference to FIGS. 3 and 4, the at least one shoe or engaging member is shown including two diametrically opposed shoes 40, 42 that are urged radially outward into respective engaged positions with the rotating member 16. More specifically, the shoes 40, 42 are arranged to normally be in respective disengaged positions. As shown, the shoes 40, 42 can include respective engaging surfaces 40a, 42a that are curved so as to match the curvature of an inside surface 16a of the rotating member 16. The inside surface 16a can be formed on a projecting wall portion (e.g., a flange 44) projecting from the rotating member 16, though other arrangements are contemplated and the depicted arrangement is for illustrating an exemplary embodiment only and not for limiting the same. Each shoe 40, 42 can be urged toward its respective engaged position, but is normally held against such urging. In the illustrated embodiment, each of the shoes 40, 42 is frictionally coupled directly with the rotating member 16 via the protruding flange 44 when in respective engaged positions (FIG. 4), though other coupling engagements can be used. For example, tooth engagement could provide the coupling between the shoes 40, 42 and the rotating member 16.

In another alternate embodiment, not illustrated, the at least one engaging member (e.g., shoe) can be urged radially inward into an engaged position with the rotating member 16. For example, the at least one shoe can include a pair of diametrically opposed shoes (not shown) positioned on the outside of the flange 44. These shoes could be arranged so as to normally be held in respective disengaged positions radially spaced apart outwardly form the flange 44 and could be controlled actively or passively for moving radially inwardly to engage the flange 44 to mechanically couple the powered component 12 to the rotating member 16.

As shown in FIGS. 3 and 4, the powered component 12 can include an electromagnet 46 for holding the shoes 40, 42 against such urging, at least while the electromagnet 46 is powered and activated. For example, the electromagnet 46 can hold the shoes 40, 42 against the urging and in the disengaged positions while power is supplied to the electromagnet 46 and the electromagnet 46 is activated (e.g., by the ECU 30). As will be described in more detail below, the electromagnet can hold the shoes 40, 42 against the urging to the engaged positions until power ceases to the electromagnet 46. Power to the electromagnet 46 could cease due to an unexpected power disruption (e.g., electrical failure or battery failure) and/or due to the ECU 30 purposefully disrupting power to the electromagnet 46.

The coupling system 10, and particularly the powered component 12, can include at least one spring urging the shoes 40, 42 radially outward toward and into their respective engaged positions with the rotating member 16. In the illustrated embodiment, the at least one spring includes a pair of springs 48, 50 that urge the shoes 40, 42 toward their engaged positions. In particular, the springs 48, 50 can be compression springs and, in the illustrated embodiment, the springs 48, 50 have first ends 48a, 50a secured to a first shoe 40 of the two shoes 40, 42 and second ends 48b, 50b secured to the second shoe 42 of the two shoes 40, 42. Thus, the compression springs 48, 50 urge the two shoes 40, 42 apart from one another and into radial engagement with the rotating member 16 particularly the protruding flange 44 thereof. Specifically in the illustrated embodiment, the two shoes 40, 42 are slidably secured on at least one post (posts 52, 54 in the illustrated embodiment) for sliding movement between the engaged positions and the disengaged positions if relative movement there between. Though not shown, the compression springs 48, 50 can be annularly disposed on the posts 52, 54 if desired.

In operation, the electromagnet 46 can hold the shoes 40, 42 in their respective disengaged positions when powered, such as being powered by the battery 20 on the vehicle 14; however, the springs 48, 50 can move the shoes 40, 42 into their respective engaged positions when cessation of battery power from the battery 20 to the powered component 12, and thus to the electromagnet 46 occurs. Accordingly, the shoes 40, 42 are urged toward their respective engaged positions by the springs 48, 50 and held in their respective disengaged positions against the urging of the springs 48, 50 by the electromagnet 46 when the electromagnet 46 is powered by the battery 20 and in an active state.

Control of the electromagnet can occur passively and/or actively. For example, control of the electromagnet 46 can be based on whether or not power is delivered by the battery 20 to the powered component 12 and/or can be controlled based on whether or not the electronic control unit 30 permits power from the battery 20 to be delivered to the powered component 12. In a passive application, power may unexpectedly be interrupted (e.g., due to a dead battery, a failed electrical connection, etc.) resulting in power ceasing to the electromagnet 46. In an active state, the electromagnet 46 can be controlled by the electronic control unit 30 and thus power can be delivered to the electromagnet 46 to either put the electromagnet 46 in its active state (i.e., delivering power to the electromagnet 46) or an inactive state (e.g., cutting power to the electromagnet 46 by the electronic control unit 30).

In the embodiment illustrated in FIGS. 3 and 4, the electromagnet 46 can include plates 56, 58, such as metallic plates, though this is not required. Likewise, the shoes 40, 42, can include plates 60, 62, such as metallic plates, that cooperate with the plates 56, 58 of the electromagnet 46 via magnetic attraction forces. Alternately, the plats 56, 58 can be eliminated and/or the plates 60, 62 could be eliminated (e.g., if the shoes 40 42 are of or contain sufficient magnetic material, such as iron). In the illustrated embodiment, the shoes 40, 42 can be a friction-type material suitable for mechanically coupling the shoes 40, 42 to the rotating member.

In the illustrated embodiment, when power is supplied to the electromagnet 46, the plates 56, 58 can forcibly via magnetic fields attract the plates 60, 62 and thus move and/or hold the shoes 40, 42 against the urging of the springs 48, 50 in their respective disengaged positions. When no power is provided to the electromagnet 46 (e.g., due to a power failure or intentionally due to control by the electronic control unit 30), no magnetic attraction occurs and the shoes 40, 42 are urged outwardly into frictional engagement with the protruding flange 44 of the rotating member 16 due to the urging of the springs 48, 50.

In one application, the coupling system 10 can be a passive fail-safe system for the vehicle 14. In this embodiment, the radial coupling 22 is passively arranged such that the powered component 12 is radially coupled to the rotating member 16 only in the event of an unexpected power disruption from the battery 20 to the powered component 12. Accordingly, in this embodiment and application, the shoes 40, 42 are arranged to normally be in the disengaged positions when the powered component 12 is powered by the battery 20 and to move to the engaged positions during an unexpected power disruption. Thus, the shoes 40, 42 are urged toward their respective engaged positions by the springs 48, 50 but are held against this urging via the electromagnet 46 until an unexpected power disruption occurs. When such an unexpected power disruption occurs, the electromagnet 46 no longer holds the shoes 40, 42 against the urging of the springs 48, 50.

Thus, the unexpected power disruption causes battery power to cease being provided to the powered component 12 and to the electromagnet 46 thereby causing the electromagnet 46 to cease holding the shoes 40, 42. This results in the springs 48, 50 urging the shoes 40, 42 into their respective engaged positions to mechanically couple the powered component 12 and the rotating member 16 which is driven by the engine 18 as described herein above. Accordingly, the radial coupling 22 in this embodiment is passively arranged such that the powered component 12 is radially coupled to the rotating member 16 only in the event of an unexpected power disruption from the battery 20 to the powered component 12 due to power to the electromagnet 46 from the battery 20 ceasing and the springs 48, 50 moving the shoes 40, 42 to their respective engaged positions.

In embodiments where the powered component 12 is an oil pump, the passive electromechanical coupling system 10 described herein enables an advantage in that the efficiency and control increases associated with conventional electric oil pumps is combined with the reliability of conventional mechanical oil pumps, including reliability during the event of a power loss within the vehicle 14. While these advantages are particular to an oil pump application, it is to be appreciated and understood by those skilled in the art that the described fail-safe system 10 could be applied to any rotating component. Moreover, the radial coupling 22 described herein can be applied to the driven hub of any piece of rotating equipment within a vehicle and applies a torque in a radially direction that allows for an advantageous coupling arrangement. Accordingly, rotating accessories on a vehicle 14 can be controlled independently of engine revolutions under normal operation, or alternatively can be coupled to engine torque (e.g., in the event of a power loss) thereby providing the reliability benefits associated with conventional mechanical driven components, such as mechanical driven oil pumps.

During normal operation, in an application including an oil pump as the powered component 12, the oil pump can be powered electrically by the battery 20. Such decoupling of the oil pump from the engine crankshaft 28 allows the output of the oil pump (e.g., oil flow rate and pressure) to be controlled independently of engine speed. For example, the oil pump can be controlled by the electronic control unit 30. Accordingly, for example, the electronic control unit 30 can cause oil pressure from the oil pump to be increased to engine bearings prior to the engine being initially started, leading to reduced start-up wear. Furthermore, at engine conditions where large oil flow rates are not required, the oil pump rotor speed can be slowed to reduce total energy consumption of the system, thereby leading to increased total engine efficiency.

When the powered component 12 loses its source of supply current (e.g., an electrical and/or battery failure), the electromagnet 46 also loses its supply current. This causes the springs 48, 50 to move the shoes 40, 42 radially into frictional engagement with the rotating member via the protruding flange 44. This results in the powered component 12 now being driven by the crankshaft 28 of engine 18, at engine revolutions, through the frictional engagement between the shoes 40, 42 and the rotating member 16. As the system 10 is passively safe, any resulting loss of power to the powered component 12 results in engagement of the shoes 40, 42. Advantageously, the coupling system 10 allows the engine 18 to maintain oil pressure during complete failure of the battery 20 and/or the electrical system of vehicle 14. Still further, in the passive arrangement, when the powered component 12 (or any powered component 12) changes from being driven electrically to mechanically, any potential slip can be identified by the electronic control unit 30 and current can be removed.

The coupling system 10 can also be intelligently controlled by the electronic control unit 30 and not merely operated in a fail-safe mode. In other words, the electronic control unit 30 can selectively determine when the radial coupling 22 is in the engaged state or the disengaged state. In one intelligent control application, if the powered component 12 were a water pump even when electric power is being supplied to the powered component 12 (i.e., there is no power failure situation), it may desirable to mechanically couple the powered component 12 to the engine 18 for increasing the power capacity of the powered component 12. For example, the mechanical power could be supplied to the powered component 12 in addition to the electric power supplied to the powered component 12. Thus, the electromagnet 46 can be controlled even when there is no failure with the battery or electrical system of the vehicle. Such intelligent control could also be applied to powered components other than water pumps for likewise increasing the power capacity of the powered component. Optionally, an electric motor associated with the powered component (e.g., electric motor 32) could be used to generate electrical power for the vehicle 14 (e.g., for another subsystem of the vehicle 14) via the radial coupling 22. For example, a rotor within the motor could be mechanically driven via the radial coupling 22 and such rotation could be used to generate power for the vehicle 14.

In another embodiment, the coupling system 10 can be intelligently controlled for selectively decoupling the powered component 12 mechanically from the engine 18. For example, the powered component 12 could be a mechanically driven water pump (e.g., only mechanically driven and not electrically driven), such as a belt driven water pump. The electronic control unit 30 could operate the electromagnet 46 to selectively decouple the water pump from the engine 18. This would effectively "turn off" the mechanical water pump, which would advantageously provide decreased engine warm up times if used when the engine is cold and first turned on, and/or decreased power consumption. If decoupled during an engine start up, the electronic control unit 30 could mechanically couple (i.e., re-couple) the water pump to the engine 18 after the engine 18 reaches a predetermined temperature (e.g., an optimal operating temperature). As with the other embodiments discussed herein, the powered component 12 need not be limited to a water pump in this intelligent control embodiment and could be any suitable vehicle component that normally is mechanically driven by the engine 18.

Figure 5:
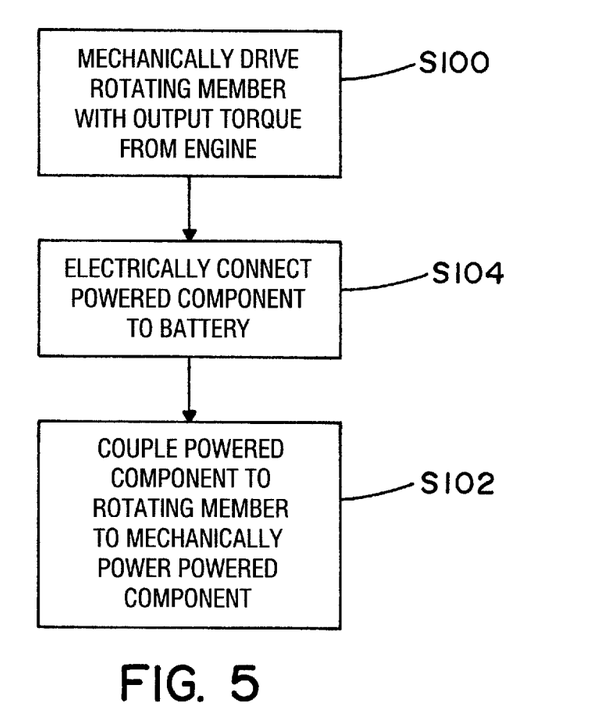
FIG. 5 is a block diagram illustrating a coupling method.

With reference to FIG. 5, a coupling method for a powered component on a vehicle will now be described. The method illustrated in FIG. 5 will be described in association with the coupling system 10 described hereinabove, though it is to be appreciated that the method could be applied to other systems and need not be limited to the system or systems described herein. As shown in FIG. 5, at S100 the rotating member 16 of the vehicle 14 is mechanically driven with output torque from the engine 18 of the vehicle 14, such as through the crankshaft 28 and force transfer element 26. In S102, the powered component 12 is coupled to the rotating member 16 for mechanically powering the powered component 12 with the output torque from the engine 18. This coupling in S104 can include use of the radial coupling 22 described herein and, when so included, the coupling can include radially moving an engaging member, such as shoes 40, 42, of the powered component 12, into coupling engagement with the rotating member 16.

Optionally, as shown at S104, the powered component 12 on the vehicle 14 can be electrically connected to the battery 20 of the vehicle 14 for electric powering of the powered component 12. As already described herein, when passively deployed, the shoes 40, 42 of the powered component 12 can be urged into coupling engagement with the rotating member 16 only when electric power from the battery 20 to the powered component 12 is interrupted. Also as already described herein, the shoes 40, 42 can be held in radially spaced relation relative to the powered component 12 with the electromagnet 46 of the powered component 12 when electric power is provided to the power member 12 and thus to the electromagnet 46. The springs 48, 50 can move the shoes 40, 42 into coupling engagement only when no electric power is provided powered component 12 from the battery 20. Alternatively, or in addition, the electromagnet 46 can be actively controlled (e.g., to provide supplemental power from the engine 18), such as via the electronic control unit 30.

Figure 6:
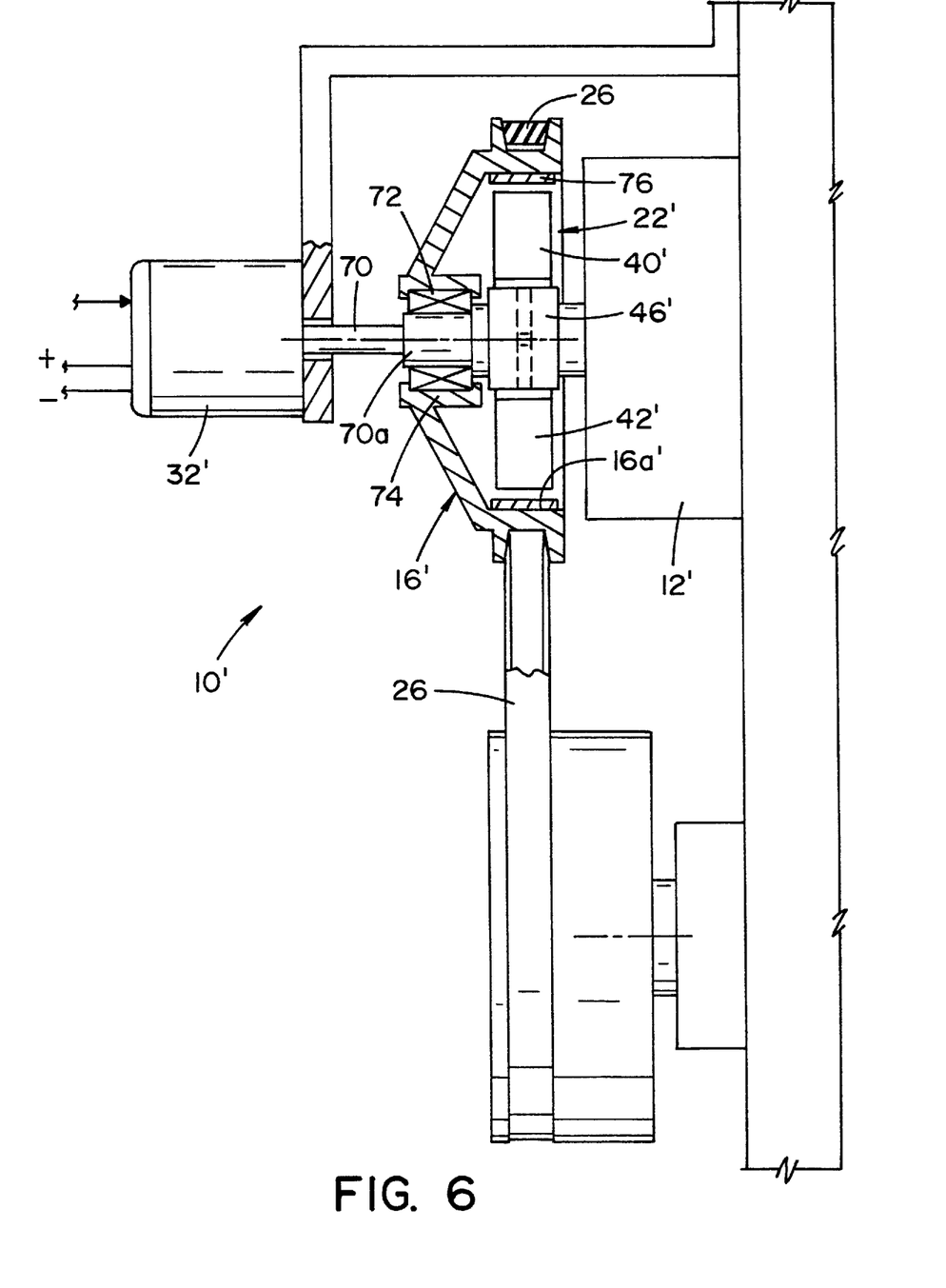
FIG. 6 is a schematic elevational view of a radial coupling according to an alternate embodiment.

With reference to FIG. 6, a coupling system 10' is shown according to an alternate embodiment. Except as indicated herein, the coupling system 10' can be the same as the coupling system 10 and thus like components are shown in FIG. 6 with like reference numbers and similar or corresponding parts are illustrated with a like reference number plus a prime symbol. In FIG. 6, a powered component 12' (e.g., a water pump or other driven component) is arranged to be driven by an electric motor 32' via a shaft 70. A rotating member 16' (e.g., a pulley) is rotatably disposed on the shaft 70, particularly on enlarged shaft portion 70a via rotatable bearing 72 and pulley mounting portion 74. The rotating member 16' is rotatably driven by force transfer element 26, which is illustrated as a belt, but torque from the rotating member 16' is normally not transferred to the shaft 70.

The coupling system 10' can include a radial coupling 22' having shoes 40', 42' that move between disengage positions that are radially spaced apart from the inner pulley surface 16' and engaged positions wherein the shoes 40', 42' directly engage the inside surface 16a' of a rotating member 16' (e.g., an inner diameter surface of a pulley) or, as shown in the illustrated embodiment, engage a lining 76 disposed on the inside surface 16a' of the rotating member 16', the lining 76 increasing the frictional torque capable of being transmitted through the radial coupling 22' from the rotating member 16' to shoes 40', 42'. Alternatively, a frictional coating (not shown) could be used in instead or in addition to the lining 76. An electromagnet 46' can be disposed on the shaft 70 axially aligned with the shoes 40', 42'. In operation, the shoes 40', 42' and the electromagnet 46' can function as described above in reference to the shoes 40, 42 and the electromagnet 46. For example, the radial coupling 22' could be used to as a passive fail-safe in the event that power to the motor 32' ceases or the motor 32' fails, the radial coupling 22' could be used to supplement or replace power from the motor 32' to the powered component 12', etc.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A coupling system for a powered component on a vehicle, comprising:
   an engine disposed on the vehicle;
   a rotating member mechanically driven by the engine;
   a powered component disposed on the vehicle; and
   a radial coupling having an engaged state and a disengaged state, the radial coupling mechanically coupling the rotating member and the powered component when in the engaged state and decoupling the rotating member and the powered component when in the disengaged state,
   wherein the radial coupling includes at least one shoe radially movable between an engaged position corresponding to the engaged state wherein the at least one shoe is coupled to the rotating member for corotation therewith and a disengaged position corresponding to the disengaged state wherein the at least one shoe is decoupled from the rotating member,
   wherein the at least one shoe includes two diametrically opposite shoes that are urged radially outward into respective engaged positions with the rotating member by at least one spring, the at least one spring including a compression spring with a first end secured to a first of the two shoes and a second end secured to the second of the two shoes, the compression spring urging the two shoes apart from one another and into radially engagement with the rotating member.

2. The coupling system of claim 1 wherein the coupling system is a passive fail-safe system for the vehicle further including:
a battery disposed on the vehicle that is electrically connected to the powered component for electric powering thereof, and wherein the radial coupling changes from the disengaged state to the engaged state to mechanically couple powered component to the rotating member in the event of an unexpected power disruption from the batten to the powered component.

3. The coupling system of claim 2 wherein the at least one shoe is arranged to normally be in the disengaged position when the powered component is powered by the battery and to move to the engaged position during the unexpected power disruption.

4. The coupling system of claim 3 wherein the at least one shoe is held against the urging toward the engaged position until the unexpected power disruption occurs when the radial coupling is in the disengaged state.

5. The coupling system of claim 4 further including:
an electromagnet for holding the at least one shoe against the urging until the unexpected power disruption, the unexpected power disruption causing battery power to cease being provided to the powered component and to the electromagnet thereby causing the electromagnet to cease holding the at least one shoe.

6. The coupling system of claim 5 wherein the electromagnet holds the at least one shoe in the disengaged position when powered by the battery, the at least one spring moving the at feast one shoe into the engaged position when cessation of battery power to the powered component and the electromagnet occurs.

7. The coupling system of claim 3 wherein the at least one shoe is frictionally coupled directly with the rotating member when in the engaged position.

8. The coupling system of claim 1 wherein the two shoes are slidably secured on at least one post for sliding movement between the engaged positions and the disengaged positions and for relative movement therebetween the compression spring annular disposed on the at least one post.

9. The coupling system of claim 1 wherein the rotating member is a pulley member associated with another vehicle component that is driven by rotation of the engine, the pulley member coupled to the engine for driven rotation thereby by a force transfer element.

10. The coupling system of claim 1 wherein a force transfer element is coupled to a crankshaft of the engine for driven rotation thereby.

11. The coupling system of claim 1 wherein the powered component is an oil pump having a fluid input line and a fluid output line.

12. The coupling system of claim 11 further including:
an electronic control unit operatively connected to the oil pump for control thereof, the electronic control unit sending command signals to the oil pump for controlling at least one of flow rate and pressure delivered by the oil pump.

* * * * *